INVENTOR.
ALBERT C. MAIER

Oct. 15, 1968     A. C. MAIER     3,406,404
FURLABLE AND UNFURLABLE MEMBER
Filed Oct. 16, 1964     2 Sheets-Sheet 2
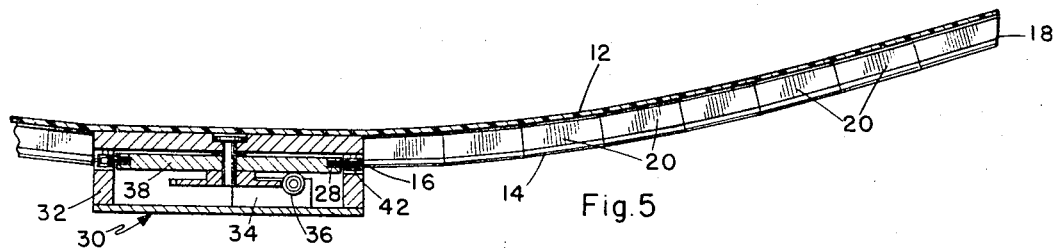
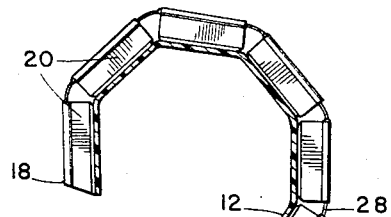
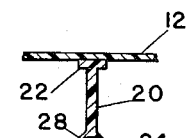
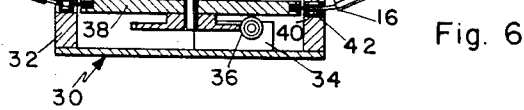
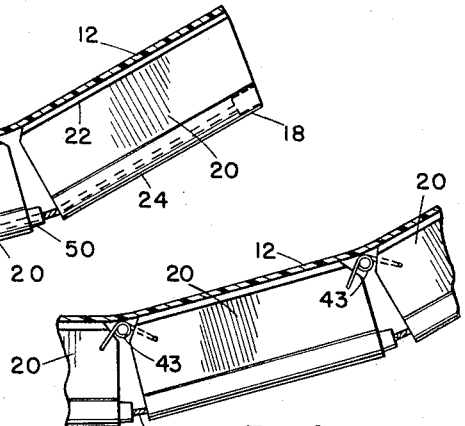
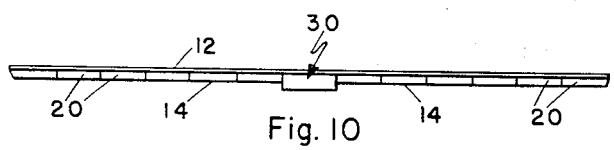
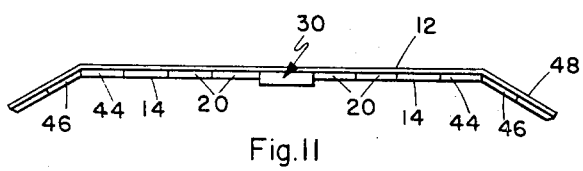
INVENTOR.
ALBERT C. MAIER
BY
Knox & Knox

United States Patent Office 3,406,404
Patented Oct. 15, 1968

3,406,404
FURLABLE AND UNFURLABLE MEMBER
Albert C. Maier, Lakeside, Calif., assignor to
The Ryan Aeronautical Co., San Diego, Calif.
Filed Oct. 16, 1964, Ser. No. 404,278
8 Claims. (Cl. 343—915)

ABSTRACT OF THE DISCLOSURE

A large radiant energy reflector of flexible material comprising a surface of revolution, is made to open and close by means of jointed radial ribs, which are collectively operated to roll inwardly and furl the reflector into a toroid form, or to unroll and extend the reflector outwardly with an unfurling action into its functional configuration.

---

The present invention relates generally to a furlable and unfurlable member and more particularly to such a member having a reflective surface of revolution thereon. The primary use is for a large parabolic antenna which is capable of being packaged into a relatively small space for stowage aboard a space craft and later deployment in space. It is applicable also for use as a solar concentrator element of a thermal solar energy conversion system or an optical reflector for signal and communication systems.

It is accordingly the primary object of this invention to provide a furlable member which may be stored in a small space.

It is a further object of this invention to provide an improved furlable member having simple and reliable means for unfurling the same.

It is a still further object of this invention to provide an improved furlable member which, when unfurled, will be accurately held to the desired shape.

It is a still further and ancillary object of this invention to provide an improved furlable member having a reflective coating thereon protected by the member when in furled condition.

Finally, it is an object to provide a furlable and unfurlable member of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 5 is a sectional view on the line 5—5 of FIGURE 4;

FIGURE 6 is a view similar to FIGURE 5 but with the rib in furled position;

FIGURE 7 is an enlarged fragmentary view of a portion of a rib;

FIGURE 8 is a sectional view on the line 8—8 of FIGURE 7;

FIGURE 9 is a view similar to a portion of FIGURE 7, showing an alternative spring arrangement for furling the member; and FIGURES 10 and 11 are diagrammatic views showing modified configurations of the furlable member.

Figure 3:
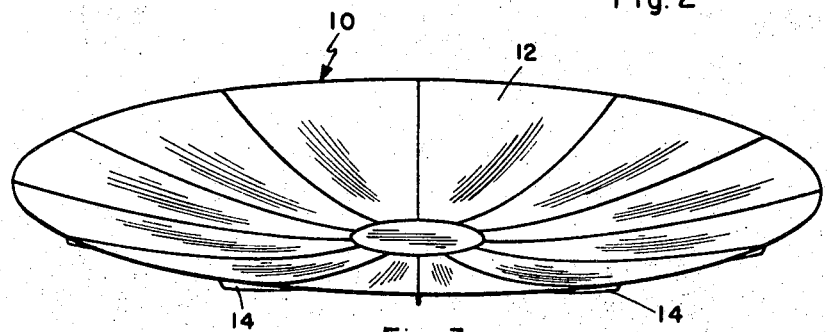
FIGURE 3 is a view looking into the inside of the member when in fully unfurled condition.

With particular reference to FIGURE 3 I have shown my novel disc-like furlable member, indicated generally by the reference numeral 10, in completely unfurled position as it would appear in use as a parabolic antenna, for example.

Figure 4:
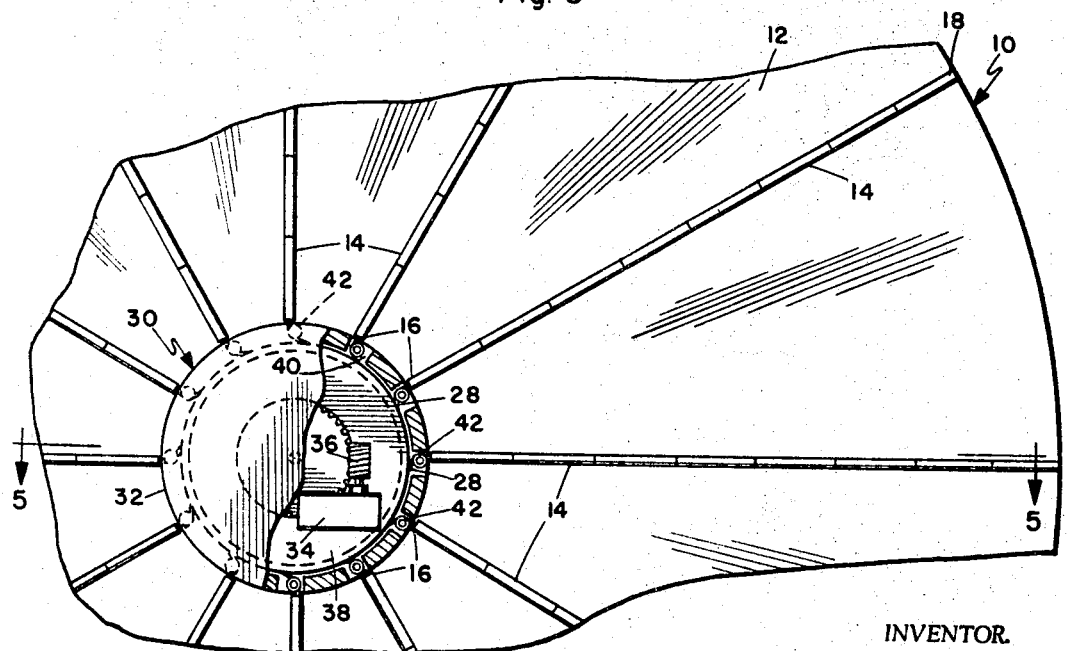
FIGURE 4 is a partial bottom view of FIGURE 3 with parts broken away.

As shown, it consists of a circular member 12 of any desired diameter formed from thin, flexible, metallized, plastic sheet or mesh material such as aluminized Mylar. In the form shown the aluminized coating is on the concave surface. In the detailed structure shown in FIGURES 4, 5 and 8, the opposite surface the member 12 is provided with a plurality of radially extending ribs 14, the inner ends 16 of which terminate adjacent the center of the member with the outer ends 18 extending to the outer periphery. Each of the ribs 14 is divided into a plurality of independent, longitudinally extending links 20. One edge 22 of each link is secured throughout its length, as by adhesive or other suitable means, to the surface of member 12. The other edge 24 is provided with a longitudinally extending bore 26 through which extends a flexible push-pull wire cable 28. The radial outer end of each cable 28 is secured to the radial outermost link 20 of each rib 14.

A suitable actuating mechanism for cables 28 is indicated generally by the reference numeral 30. In a preferred form, this mechanism consists of a housing 32 secured to the flexible member 12. Enclosed within the housing 32 is a suitable reversible motor means 34 connected by conventional reduction gearing 36 to a drum 38. Each cable 28 extends through a slot 40 in housing 32 over a pulley 42 suitably mounted therein and is fixedly secured to drum 38.

As will be evident from the above description, furling or unfurling of the member 12 is accomplished by the cables 28 through actuation of the motor 34 in the proper direction of rotation. With the member 12 fully unfurled, that is, as shown in FIGURE 3, motor 34 is energized to rotate the drum 38 in a direction to extend cables 28. This will cause a curling of the outer periphery axially and radially inwardly until the ribs 14 have assumed a position as shown in FIGURE 6, the general shape of the member 12 in this position being that of a torus as clearly seen in FIGURE 1.

In smaller sizes of units the inherent stiffness of cables 28 will be sufficient to separate the links 20 and furl the structure as the cables are extended, the unsupported portions of cable between the separated links being very short. However, in large units, or in special cases, furling can be made more positive by inserting a small torsion spring 43 between each adjacent pair of links 20 at the hinge point, as in FIGURE 9. This can be a rolled type spring as illustrated, or a leaf spring secured to the member 12 between links, the spring being biased to fold member 12 and separate the links when cables 28 are relaxed.

Figure 1:
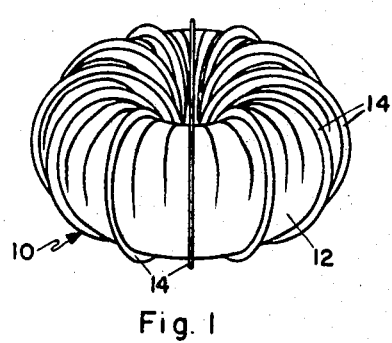
FIGURE 1 is a view of the novel member, which is the subject of this invention, in fully furled condition.
Figure 2:
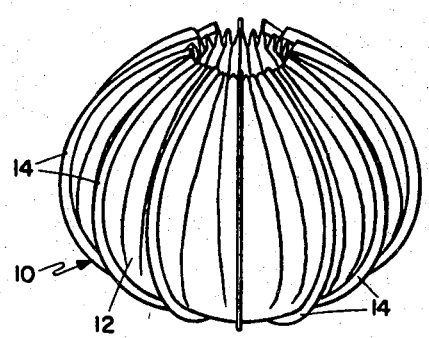
FIGURE 2 is a view showing the member partly unfurled.

It will be seen that in the furled condition of FIGURE 1 the member 10 may be packaged in a relatively small space. For this reason, it finds particular utility for stowage aboard a space craft and later deployment in space.

The unfurled shape of member 12 is determined by the angular inclination of the abutting ends of links 20. This is represented diagrammatically in the modification shown in FIGURE 10 in which the abutting ends of the links are at right angles to the plane of their base. In this form the member 12 will be extended to lie in a flat plane as shown. In the form shown in FIGURE 11, the abutting ends of two adjacent links such as 44 and 46 are cut at an acute angle so that the outer peripheral portion 48 of member 12 will be inclined as shown.

If desired, individual links 20 may be provided with aligning and reinforcing means. To this end each link is provided with a sleeve member 50 which is pressed into the bore 26 and extends outwardly therefrom as shown in FIGURE 7. As the adjacent links are drawn together, the extending end of sleeve 50 telescopes in the bore 26 of the adjacent link thus providing a positive means of alignment.

From the above description it will be evident that I have provided a furlable and unfurlable member which may be stored in a relatively small space and when furled forms a complete protecting means for a reflective or optical coating thereon.

It is understood that minor variation from the form of the invention disclosed herein may be made without departure from the spirit and scope of the invention, and that the specification and drawings are to be considered as merely illustrative rather than limiting.

I claim:
1. A furlable and unfurlable antenna comprising:
   a thin flexible, generally disc-like member;
   a radiant energy reflective coating on one surface of said member; and
   means on the other surface of said member, connected with the peripheral edge, for moving said peripheral edge radially and axially inwardly to furl said member into a generally toroidal shape.
2. The structure of claim 1 in which said means includes a plurality of radially extending ribs secured to said other surface.
3. The structure of claim 2 in which each rib is divided into a series of abutting links.
4. The structure of claim 3 in which each link has a longitudinally extending bore therethrough, said bores in the links of each rib being generally aligned, a push-pull wire cable extending through said generally aligned bores and secured to the periphery of said member.
5. The structure of claim 4 further including means for extending and retracting said push-pull cable.
6. The structure of claim 5 in which the adjacent ends of said links have interlocking alignment means.
7. The structure of claim 6 in which the inclination of the abutting ends of said links determines the shape of said member when in extended position.
8. The structure of claim 3 and further including spring means connected between adjacent links and being biased to separate the links and roll said ribs inwardly to furl the member.

References Cited

UNITED STATES PATENTS

| | | | |
|---|---|---|---|
| 534,058 | 2/1895 | Ackermann et al. | 135—20 |
| 1,473,906 | 11/1923 | Hartzell | 135—25 |
| 2,282,695 | 5/1942 | Badovinac | 135—25 |
| 2,674,693 | 4/1954 | Millett et al. | 343—915 X |
| 3,070,188 | 12/1962 | Scruby | 182—163 |

HERMAN KARL SAALBACH, *Primary Examiner.*

P. L. GENSLER, *Assistant Examiner.*